United States Patent
Bouvet et al.

(10) Patent No.: US 12,547,394 B2
(45) Date of Patent: Feb. 10, 2026

(54) METHOD FOR GENERATING AN UPDATE FILE AND CORRESPONDING SERVER DEVICE, UPDATING METHOD AND CORRESPONDING CLIENT DEVICE, UPDATING METHOD AND CORRESPONDING SYSTEM

(71) Applicant: STMICROELECTRONICS (ROUSSET) SAS, Rousset (FR)

(72) Inventors: Yoann Bouvet, Opio (FR); Jean-Paul Coupigny, Cannes (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 348 days.

(21) Appl. No.: 18/364,957

(22) Filed: Aug. 3, 2023

(65) Prior Publication Data

US 2024/0069901 A1    Feb. 29, 2024

(30) Foreign Application Priority Data

Aug. 29, 2022    (FR) ...................................... 2208639

(51) Int. Cl.
   *G06F 8/65*    (2018.01)
   *G06F 8/71*    (2018.01)

(52) U.S. Cl.
   CPC . *G06F 8/65* (2013.01); *G06F 8/71* (2013.01)

(58) Field of Classification Search
   None
   See application file for complete search history.

(56) References Cited

U.S. PATENT DOCUMENTS

| 8,107,397 | B1 * | 1/2012 | Bagchi | .................. | H04L 9/0822 |
| | | | | | 380/278 |
| 9,268,552 | B1 | 2/2016 | Kiiskila et al. | | |
| 11,467,818 | B2 * | 10/2022 | Teraoka | ................ | B60L 3/0061 |

(Continued)

FOREIGN PATENT DOCUMENTS

| EP | 0472812 A1 | 3/1992 |
| EP | 1755039 A1 | 2/2007 |

(Continued)

OTHER PUBLICATIONS

Arakadakis et al., "Firmware over-the-air programming techniques for IoT networks—a survey," arXiv, 2020. (Year: 2020).*

(Continued)

*Primary Examiner* — Ryan D. Coyer
(74) *Attorney, Agent, or Firm* — Seed IP Law Group LLP

(57) ABSTRACT

A server builds an update file to update software. The server compiles source code of an updated version of the software, generating a binary file of the updated version of the software. Memory locations are mapped to sections of the binary file based on mappings of sections of a binary file of a prior version of the software. Bits of sections of a plurality of sections of the binary file of the prior version are logically combined, bit-by-bit, with bits of corresponding sections of the binary file of the updated version. The logically combining includes: applying an exclusive or operation; or applying an exclusive nor operation. The update file is built based on the mapping of the memory locations and on results of the logical combining.

21 Claims, 8 Drawing Sheets

(56) References Cited

U.S. PATENT DOCUMENTS

| | | | |
|---|---|---|---|
| 2014/0237462 A1* | 8/2014 | Zheng | G06F 8/65 |
| | | | 717/170 |
| 2014/0314235 A1* | 10/2014 | Matischek | H04N 1/4486 |
| | | | 380/243 |
| 2016/0170733 A1* | 6/2016 | Martin | G06F 21/602 |
| | | | 713/191 |

FOREIGN PATENT DOCUMENTS

| | | | |
|---|---|---|---|
| EP | 1956482 A1 | 8/2008 | |
| EP | 1569102 B1 | 4/2010 | |

OTHER PUBLICATIONS

Srivastava et al., "An open-source SWUpdate and Hawkbit framework for OTA Updates of RISC-V based resource constrained devices," ResearchGate, 2021. (Year: 2021).*

Sun et al., Design of Over-the-Air Firmware Update and Management for IoT Device with Cloud-based RESTful Web Services, IEEE, 2021. (Year: 2021).*

Von Platen et al., "Feedback Linking: Optimizing Object Code layout for Updates" *LCTES 1 '06*, Jun. 14-16, 2006, Ottawa, Ontario, Canada. (10 pages).

Vyawahare, "Delta Over-the-Air Updates," Jan. 12, 2022, URL: https://www.freetos.org/2022/01/delta-over-the-air-updates.html, download date Oct. 25, 2022. (3 pages).

* cited by examiner

METHOD FOR GENERATING AN UPDATE FILE AND CORRESPONDING SERVER DEVICE, UPDATING METHOD AND CORRESPONDING CLIENT DEVICE, UPDATING METHOD AND CORRESPONDING SYSTEM

BACKGROUND

Technical Field

Implementations and embodiments relate to the techniques for updating software, in particular the generation of an update file by a server device, and the updating of the software by a client device.

Description of the Related Art

The techniques for updating software can be critical functionalities in terms of energy consumption bandwidth for transmitting the update file to the client devices, in particular for cases having a limited bandwidth, and aiming to save energy.

This is for example the case in campaigns of OTA over-the-air updating of client devices of the IoT Internet of things type deployed on the ground, where typically the bandwidth of the network is limited and costly and where typically the IoT client devices tend to use very little energy.

For example, the networks having a limited bandwidth and aiming to save energy can be of the LPWAN (acronym for the terms Low Power Wide Area Network) type such as LoRaWAN, BLE, Cat-M1, NB-IoT (respectively for Long Range WAN, Bluetooth Low Energy, Machine Type Communication, Category 1 and Narrow Band-IoT), or of the Wi-Fi type (the communication protocol governed by the standards of the group IEEE 802.11).

Reducing the quantity of data transmitted has a considerable effect on the savings in energy during the reception of the update file by the IoT client device and also on the cost of the associated bandwidth.

That being said, in general it is always advantageous to limit the quantity of data transmitted and the consumption of energy, even in the communication systems not being particularly limited in this respect (for example in the communications of the type LTE, 4G, 5G respectively for Long Term Evolution, 4th Generation, 5th Generation), for reasons of efficiency and/or restraint in the use of the available resources.

FIG. 1 illustrates an example of a conventional technique allowing to limit the quantity of data in an update file FWupdt, from an old version of a software FW_vN to a new version FWvN+1. Various modules App, UTIL, HAL, SBSFU and various functions MWfunc1, MWfunc2_vN, ..., MWfuncN of the software occupy memory regions, represented by the respective rectangles, of a memory.

The update file FWupdt communicates the memory regions that have been modified "XX . . . X" from the old version to the new version of the software, and not those that are unchanged "0." That being said, if a memory region is added or removed in the volume of the memory, or if the modification of a function MWfunc2_vN+1 modifies the size of the corresponding memory region (larger or smaller), then all the following memory regions are offset MWfunc2_vN+1, . . . , MWfuncN, UTIL, HAL, SBSFU, even if their contents are not modified in the new version. Indeed, the conventional memory mapping mechanisms assign memory locations at successive positions in the memory, to the successive functions of the code. Consequently, the memory regions positioned successively after the location of a modification are typically all offset, and are communicated as modified memory regions "XX . . . X" in the update file FWupdt.

Moreover, the conventional compression techniques, for example typically "ZIP" or "RAR" compression, have limits in performance and require providing the client devices with a corresponding decompression means. However, this type of decompression means can represent a relatively large part, for example 10% to 15%, of the code recorded in the memory, in particular in the simplest and least costly IoT devices.

BRIEF SUMMARY

Embodiments and implementations proposed below facilitate sending an extremely small update file, including almost only the binary differences between the versions of the software, in a manner compatible with the current and usual architectures of software. Moreover, the "decompression" of the update file is simple and requires few resources, and the recording of the update can be carried out "on site" directly in the memory, without requiring a "buffer" memory space the size of the entire software.

In an embodiment, a method comprises: building an update file associated with a first version of software, the building the update file including: compiling source code associated with a second version of the software, the compiling generating a binary file of the second version of the software; mapping memory locations to sections of the binary file of the second version of the software based on mappings of sections of a binary file of the first version of the software to memory locations, wherein a section of the binary file of the second version of the software having a corresponding section in the binary file of the first version of the software is mapped to a same memory location as the corresponding section of the binary file of the first version of the software; for one or more sections of a plurality of sections of the binary file of the first version of the software, logically combining, bit-by-bit, bits of the binary file of the first version of the software with bits of the corresponding section of the binary file of the second version of the software, the logically combining including: applying an exclusive or operation; or applying an exclusive nor operation; and building the update file based on the mapping of the memory locations to sections of the binary file of the second version of the software and on results of the logical combining of the one or more sections of the plurality of sections of the binary file of the first version of the software with the corresponding sections of the binary file of the second version of the software.

In an embodiment, a method comprises: updating a binary file of a first version of software to a binary file of a second version of the software based on an update file, the updating including: identifying, based on the update file, one or more sections of a plurality of sections of the binary file of the first version of the software; logically combining, bit-by-bit, bits of the identified sections of the binary file of the first version of the software with bits of the update file corresponding to the identified sections, the logically combining including: applying an exclusive or operation; or applying an exclusive nor operation; and replacing bits of the identified sections of the binary file of the first version of the software with results of the logical combining.

In an embodiment, a system comprises: an interface; and processing circuitry coupled to the interface, wherein the processing circuitry, in operation, builds an update file associated with a binary file of a first version of software, the building the update file including: compiling source code associated with a second version of the software, the compiling generating a binary file of the second version of the software; mapping memory locations to sections of the binary file of the second version of the software based on mappings of sections of the binary file of the first version of the software to memory locations, wherein a section of the binary file of the second version of the software having a corresponding section in the binary file of the first version of the software is mapped to a same memory location as the corresponding section of the binary file of the first version of the software; for one or more sections of a plurality of sections of the binary file of the first version of the software, logically combining, bit-by-bit, bits of the binary file of the first version of the software with bits of the corresponding section of the binary file of the second version of the software, the logically combining including: applying an exclusive or operation; or applying an exclusive nor operation; and building the update file based on the mapping of the memory locations to sections of the binary file of the second version of the software and based on results of the logical combining of the one or more sections of the plurality of sections of the binary file of the first version of the software with the corresponding sections of the binary file of the second version of the software.

In an embodiment, a device comprises: a memory; and processing circuitry coupled to the memory, wherein the processing circuitry, in operation, updates a binary file of a first version of software to a binary file of a second version of the software based on an update file, the updating including: identifying, based on the update file, one or more sections of a plurality of sections of the binary file of the first version of the software; logically combining, bit-by-bit, bits of the identified sections of the binary file of the first version of the software with bits of the update file corresponding to the identified sections, the logically combining including: applying an exclusive or operation; or applying an exclusive nor operation; and replacing bits of the identified sections of the binary file of the first version of the software with results of the logical combining.

In an embodiment, a non-transitory computer-readable medium's contents cause a server to build an update file associated with a first version of software, the building the update file including: compiling source code associated with a second version of the software, the compiling generating a binary file of the second version of the software; mapping memory locations to sections of the binary file of the second version of the software based on mappings of sections of a binary file of the first version of the software to memory locations, wherein a section of the binary file of the second version of the software having a corresponding section in the binary file of the first version of the software is mapped to a same memory location as the corresponding section of the binary file of the first version of the software; for one or more sections of a plurality of sections of the binary file of the first version of the software, logically combining, bit-by-bit, bits of the binary file of the first version of the software with bits of the corresponding section of the binary file of the second version of the software, the logically combining including: applying an exclusive or operation; or applying an exclusive nor operation; and building the update file based on the mapping of the memory locations to sections of the binary file of the second version of the software and on results of the logical combining of the one or more sections of the plurality of sections of the binary file of the first version of the software with the corresponding sections of the binary file of the second version of the software.

In an embodiment, a non-transitory computer-readable medium's contents cause a device to update a binary file of a first version of software to a binary file of a second version of the software, the updating including: identifying one or more sections of a plurality of sections of the binary file of the first version of the software; logically combining, bit-by-bit, bits of the identified sections of the binary file of the first version of the software with bits corresponding to the identified sections, the logically combining including: applying an exclusive or operation; or applying an exclusive nor operation; and replacing bits of the identified sections of the binary file of the first version of the software with results of the logical combining.

According to one aspect, in this respect a method is proposed for generating a file for updating an older version of a software to a later version of the software, comprising:
  a compilation of a source code generating a binary file of the later version;
  a publishing of links assigning memory locations of a memory to sections of the binary file of the later version, the memory locations of said sections of the later version being constrained to be identical to the memory locations of the corresponding sections of the earlier version;
  a comparison between the binary file of the later version and a binary file of the earlier version; and
  a building of the update file including the differences, by memory regions, between said compared binary files.

Said publishing of a link can be designated by the term mapping.

Thus, since the mapping of the binary data of the later version is constrained by the mapping of the earlier version, then, in particular, a modification of a section does not engender an offset of the sections located after this modified section and which have not been modified, the respective positions of the sections being constrained, that is to say imposed, during the mapping. Consequently, only the memory regions of the binary file that correspond to portions of the source code effectively modified are effectively modified after the mapping. Thus, only these memory regions of the binary file may be communicated in the update file.

Moreover, it is understood that a section corresponds to the size in memory allowing to house the code of an elementary object (for example a function or a scalar) coming from the source code. Typically in this case, a section can have a size between 8 bits and n*8 bits (a whole number multiple "n" of an octet of 8 bits) when an octet of 8 bits is the elementary size of the processor. As for the memory regions, they correspond to the granularity with which the differences are communicated. In general, the memory regions can have a size between 1 bit and an entire memory page (that is to say the maximum size accessible in the memory). In practice, the memory regions can have a size of 16 octets or more.

According to one embodiment, the update file does not include the memory regions not having differences between said compared binary files, and wherein the update file includes an identification of the memory locations, in the binary file of the earlier version, of the memory regions having said differences between said compared binary files.

This corresponds to a compression technique in which the update file does not include information relating to the memory regions not having any difference with respect to the earlier version.

According to one embodiment:
said comparison between said binary files is carried out bit by bit by an exclusive or operator; and
said building of the update file includes the results of the bit by bit comparison by the exclusive or operator, to communicate said differences between said compared binary files.

The exclusive or operator advantageously allows to introduce the differences directly into the memory receiving the update, without having to store an entire image of the binary file of the later version, because the exclusive or operator is its own inverse.

According to one embodiment, if the binary file of the later version includes a section having a larger size in memory than the memory location assigned to this section in the earlier version, then the publishing of links assigns a new memory location, free in the earlier version, to said larger section, and introduces an instruction for calling the new memory location, in the memory location assigned to this section in the earlier version.

Thus, no section located between the memory location assigned to the section modified in the earlier version and the new memory location is offset or modified, despite the larger size of the modified section.

According to one embodiment, if the binary file of the later version includes a section smaller in memory than the memory location assigned to this section in the earlier version, then the publishing of links assigns the same memory location having this same size and leaves empty the excess size of the memory location.

Thus, no section located after the memory location assigned to the section modified in the earlier version is offset or modified, despite the smaller size of the modified section.

In particular in this embodiment, the modified section could be entirely erased, and thus have a null size in memory. In this case, the mapping assigns the same memory location having the same size as in the earlier version, while leaving empty this memory location in the later version.

According to another aspect, a method is proposed for updating an earlier version of a software contained in a memory to a later version of the software, comprising:
receiving an update file including the differences, by memory regions, between a binary file of the later version and a binary file of the earlier version;
replacing, in the part of the memory containing the binary file of the earlier version, the bits of the memory regions having differences with the bits of the memory regions of the binary file of the later version.

In other words, it is proposed to replace the binary bits of the file directly in the memory, to update only the differences from the point of view of the binary data contained in the memory, and not from the "functional" point of view of the objects of the code (functions and scalar data) that were modified in the later version.

According to one embodiment:
said update file does not include the memory regions not having differences between said compared binary files, and includes an identification of the memory locations, in the binary file of the earlier version, of the memory regions having said differences between said compared binary files;
said replacement comprises a reading of said identification and a selective access to said memory locations identified.

This "decompression" mechanism, corresponding basically to access to an address of the memory, has the advantage of being extremely simple to implement, and of not requiring a calculation resource like usually in the algorithmic decompression mechanisms (for example of the "zip" or "rar" type).

According to one embodiment:
said update file includes the result of a bit by bit comparison by an exclusive or operator between the binary file of the later version and the binary file of the earlier version, to communicate said differences between said compared binary files;
said replacement comprises a transformation of the bits contained in said memory regions of the binary file of the earlier version by the exclusive or operator with the bits of said result of the bit by bit comparison by the exclusive or operator between said binary files.

According to one embodiment of the method for updating an earlier version of a software to a later version of the software, the earlier version having been updated from a previous version with the earlier update file, and the later version corresponding to a return to said previous version:
the update file is the earlier update file;
said replacement comprises a transformation of the bits contained in said memory regions of the binary file of the earlier version by the exclusive or operator with the bits of said regions from the result of the comparison of the earlier update file.

According to another aspect, a method is also proposed for updating an earlier version of a software to a later version of a software, for at least one device, comprising:
a method for generating a file for updating the earlier version of a software to the later version of the software as defined above, by a server device;
communication to said at least one device of the update file, by a communication network;
a method for updating an earlier version of a software to the later version of the software as defined above, by said at least one client device.

For example, the communication can be adapted for a communication network of the LPWAN (for Low Power Wide Area Network) type such as LoRaWAN, BLE, Cat-M1, NB-IoT (respectively for Long Range WAN, Bluetooth Low Energy, Machine Type Communication, Category 1 and Narrow Band-IoT), but also of the Wi-Fi type (defined by the standard IEEE 802.11), of the LTE 4G/5G (for Long Term Evolution, $4^{th}/5^{th}$ generation) type or of the wired connection type such as Ethernet or USB.

According to another aspect, a server device is also proposed, capable of generating a file for updating an earlier version of a software to a later version of the software, comprising:
a compiler configured to compile a source code so as to generate a binary file of the later version;
a link publisher configured to assign memory locations of a memory to sections of the binary file of the later version, so that the memory locations of said sections of the later version are constrained to be identical to the memory locations of the corresponding sections of the earlier version;
a compressor configured to:
compare the binary file of the later version to a binary file of the earlier version; and to
build the update file including the differences, by memory regions, between said compared binary files.

According to one implementation, the compressor is configured to build the update file not including the memory regions not having differences between said compared binary files, and to build the update file including an identification of the memory locations, in the binary file of the earlier version, of the memory regions having said differences between said compared binary files.

According to one implementation, the compressor is configured to:
compare said binary files bit by bit by an exclusive or operator; and
build the update file including the results of the bit by bit comparison by the exclusive or operator, to communicate said differences between said compared binary files.

According to one implementation, the link publisher is configured, if the binary file of the later version includes a section having a larger size in memory than the memory location assigned to this section in the earlier version, to assign a new memory location, free in the earlier version, to said larger section, and to introduce an instruction for calling the new memory location, in the memory location assigned to this section in the earlier version.

According to one implementation, the link publisher is configured, if the binary file of the later version includes a section smaller in memory than the memory location assigned to this section in the earlier version, to assign the same memory location having this same size and to leave empty the excess size of the memory location.

According to another aspect, a client device is also proposed capable of updating an earlier version of a software contained in a memory to a later version of the software, comprising:
reception means configured to receive an update file including the differences, by memory regions, between a binary file of the later version and a binary file of the earlier version;
processing means configured to replace, in the part of the memory containing the binary file of the earlier version, bits of the memory regions having differences with the bits of the memory regions of the binary file of the later version.

According to one implementation:
the reception means are configured to receive the update file not including the memory regions not having differences between said compared binary files, and including an identification of the memory locations, in the binary file of the earlier version, of the memory regions having said differences between said compared binary files;
the processing means are configured to read said identification and selectively access said memory locations identified.

According to one implementation:
the reception means are configured to receive the update file including the result of a bit by bit comparison by an exclusive or operator between the binary file of the earlier version and the binary file of the later version, to communicate said differences between said compared binary files;
the processing means are configured to transform the bits contained in said memory regions of the binary file of the earlier version by the exclusive or operator with the bits of said result of the bit by bit comparison by the exclusive or operator between said binary files.

According to one implementation, in the client device capable of updating an earlier version of a software to a later version of the software, the earlier version having been updated from a previous version with the earlier update file, and the later version corresponding to a return to said previous version:
the reception means are configured to recover the earlier update file as the update file;
the processing means are configured to transform the bits contained in said memory regions of the binary file of the earlier version by the exclusive or operator with the bits of said result of the earlier update file.

According to another aspect, a system is also proposed including a server device as defined above and at least one client device as defined above, the server device being capable of communicating said file for updating the earlier version of a software to the later version of the software, to said at least one client device by a communication network, and the client device being capable of updating the earlier version of a software to the later version of the software with this update file.

BRIEF DESCRIPTION OF THE SEVERAL VIEWS OF THE DRAWINGS

Other advantages and features of the invention will appear upon examination of the detailed description of embodiments and implementations, in no way limiting, and of the appended drawings in which.

DETAILED DESCRIPTION

Figure 1:
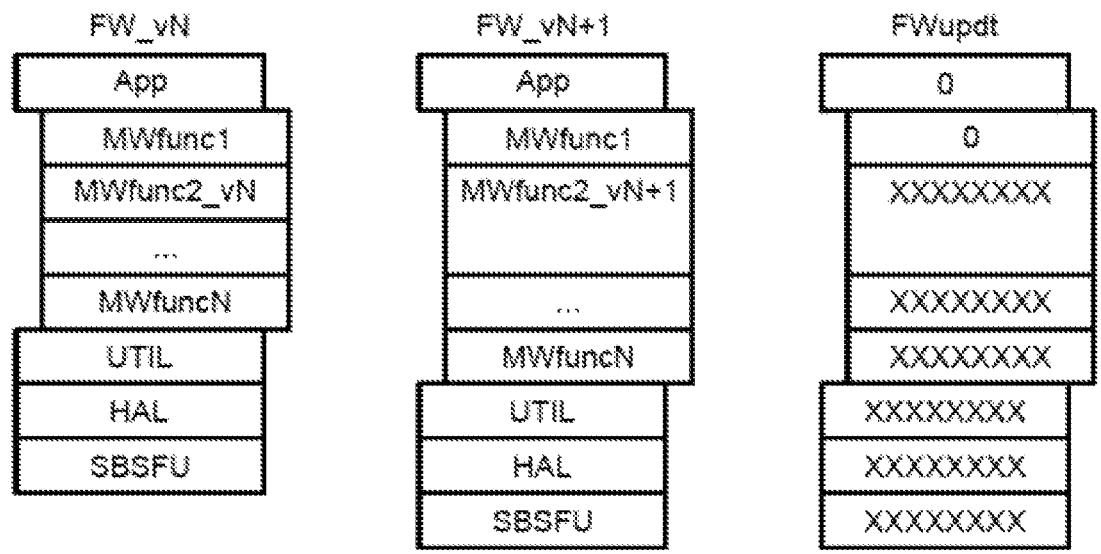
FIG. 1 described above illustrates a case of the prior art.
Figure 2:
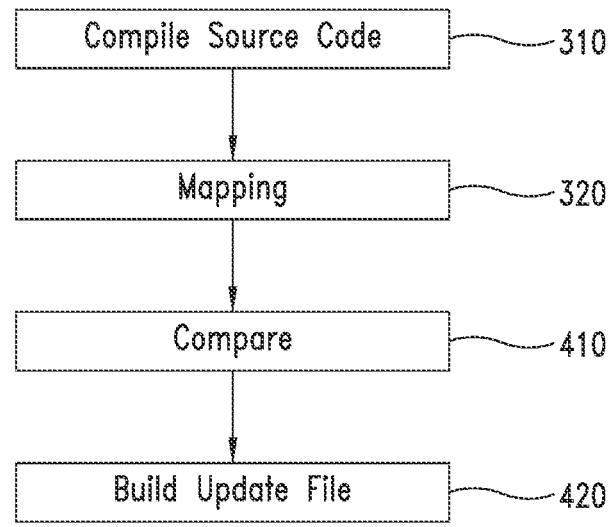
FIG. 2 illustrates an embodiment of a method for generating a file for updating an earlier version of a software to a later version of the software.

FIG. 2 illustrates a method for generating a file for updating an earlier version of a software to a later version of the software. The software is for example a firmware of a client device of the IoT type, while the generation of the update file can be implemented by a server device, which, in operation, carries out campaigns of updating of the software of the client devices remotely.

The method for generating the update file comprises:
- a step 310, for example, as described in detail below in relation to FIG. 3, in which a source code is compiled, generating a binary file of the later version;
- a step 320, for example, as described in detail below in relation to FIG. 3, in which a publishing of links, or "a mapping," is carried out for a memory of the client devices, so as to assign memory locations to sections of the binary file of the later version, the memory locations of said sections of the later version being constrained to be identical to the memory locations of the corresponding sections of the earlier version;
- a step 410, for example, as described in detail below in relation to FIG. 4, in which the binary file of the later version and a binary file of the earlier version are compared; and
- a step 420, for example, as described in detail below in relation to FIG. 4, in which the update file is built, so that the update file includes the differences, by memory regions, between said compared binary files.

It is noted that the method for generating the update file facilitates minimizing the quantity of data transmitted with a "computing" approach, that is to say during the compilation and the mapping of the code, contrary to the conventional techniques of patches superimposed on the old version ("patching") or inserted in free locations provided in this regard in the old version ("padding"), which are carried out with a "programming" approach during the writing of the code.

Figure 3:
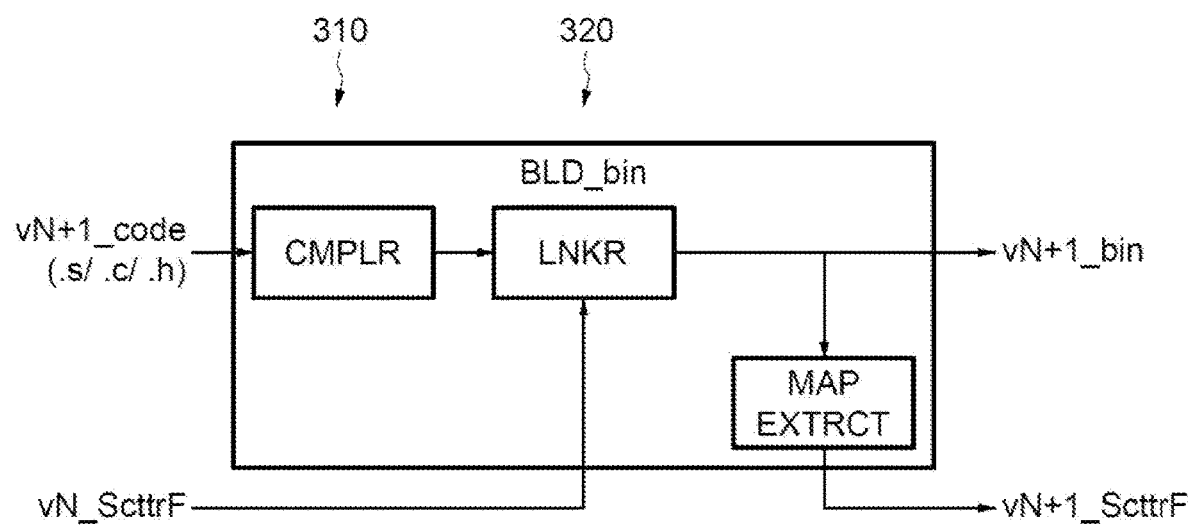
FIG. 3 illustrates an embodiment of a compilation step and an embodiment of a mapping step that may be employed in an embodiment of the method described in relation to FIG. 2.

FIG. 3 illustrates an embodiment of the compilation step 310 and an embodiment of the step of publishing links 320, or "of mapping" 320, of the method described in relation to FIG. 2, for example implemented in a server device. The server device can include in this respect a BLD_bin block or circuitry, which, in operation, builds the binary file according to steps 310 and 320.

On the one hand, a compiler CMPLR is configured to compile a source code vN+1_code so as to generate a binary file vN+1_bin of the later version of the software FW_vN+1, according to step 310.

The source code vN+1_code may be written in a programming language readable by a person (.s/.c/.h), such as C, C++, Python, or others. Advantageously, the programmer who develops the source code vN+1_code of the later version does not have a particular constraint to respect to obtain a generation of a file for updating a minimum quantity of data.

The binary file vN+1_bin, also called executable file, is a file, the references of which have been resolved and which can be placed in memory to be executed. The binary file vN+1_bin may be, for example, written in a machine language, and typically includes instructions or elementary functions, coded in binary in memory sections. A section of the binary file corresponds to an elementary logic unit containing a sequence of octets corresponding to a piece of data or of code to be placed at a physical location of the memory. Typically, a section can have a size defined in octets, or even of at least 4 octets, and for example a section can correspond to a word of 32 bits (4 octets) to code an instruction to jump to or to call a memory address, as well as the 32 bits to identify said address.

On the other hand, a link publisher LNKR block or circuit is configured to carry out the mapping of the binary file vN+1_bin, that is to say assign memory locations, in the memory intended to contain the software, to each section of the binary file vN+1_bin generated by the compiler CMPLR, according to step 320.

The link publisher LNKR may be configured to carry out a static mapping constrained by a configuration file vN_ScttrF. The configuration file constraining the link publisher LNKR corresponds to the mapping file vN_ScttrF (usually scatter file) of the sections of the earlier version of the software FW_vN.

Thus, the link publisher LNKR may be configured so that the memory locations of the sections of the later version FW_vN+1 are forced to be the same as the memory locations of the corresponding sections of the earlier version FW_vN.

Indeed, during the mapping step 320, all the sections of the binary file of the later version vN+1_bin already existing in the binary file of the earlier version vN_bin are placed in the same memory location. The new sections of the binary file of the later version vN+1_bin can be placed at new memory locations (see below #200 in relation to FIG. 6).

Moreover, the mapping file vN+1_ScttrF of the sections of the file of the later version vN+1_bin is extracted by a MAP EXTRCT block or circuit, in order in particular to constrain the mapping of a possible future update from this later version vN+1.

Figure 4:
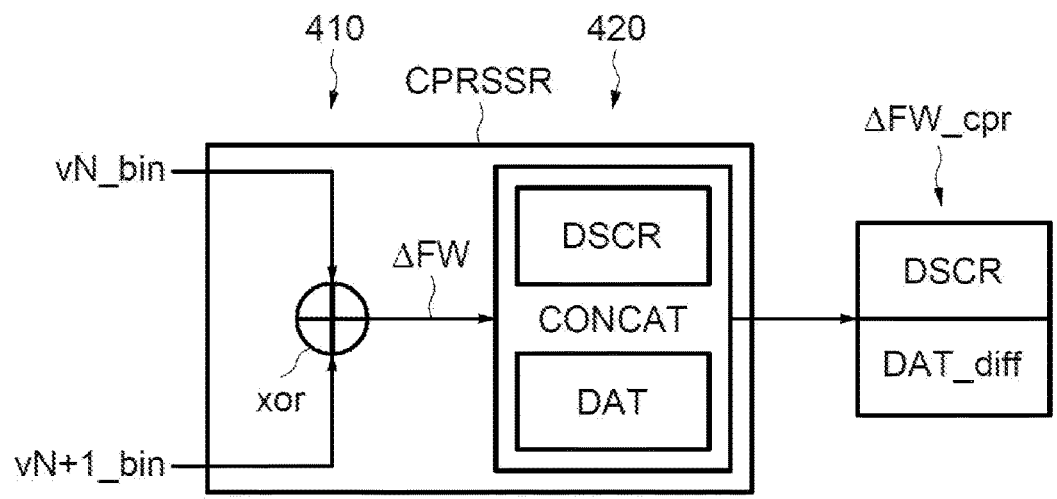
FIG. 4 illustrates an embodiment of a comparison step and an embodiment of a building step that may be employed in an embodiment of the method described in relation to FIG. 2.

FIG. 4 illustrates an embodiment of the comparison step 410 and an embodiment of the building step 420 that may be employed by the method described in relation to FIG. 2, for example implemented in the server device. The server device can include in this regard a compressor CPRSSR block or circuit, which, in operation, builds the update file according to steps 410 and 420.

On the one hand, the compressor CPRSSR is configured to compare, according to step 410, the binary file of the later version vN+1_bin, compiled and mapped in steps 310 and 320, to the binary file vN_bin of the earlier version obtained earlier in the same manner.

Advantageously, the comparing of step 410 may be a comparison bit by bit by an exclusive or operator xor, between said binary files N+1_bin, vN_bin.

The result (which will be called non-compressed result file) ΔFW exiting the bit by bit comparison by the exclusive or operator xor is a binary file having the size of the larger binary file out of the earlier version vN and the later version vN+1. Each bit, in the result file ΔFW, corresponds to a position of respective bits in the compared binary files vN+1_bin, vN_bin, and the value of each bit in the result file ΔFW is equal to "0" when at this position in the compared binary files vN+1, vN the bits are identical, and is equal to "1" when at this position in the compared binary files vN+1, vN the bits are different.

This indeed allows to communicate the differences between said compared binary files, which is sufficient to update the entire binary file to the later version vN+1_bin, knowing the earlier version vN_bin.

Alternatively, it is noted that an equivalent mechanism for identifying the differences, such as by the exclusive nor operator providing the same result in which in which the "0" and the "1" are inversed, can also be chosen.

Moreover, the compressor CPRSSR is configured to build, according to step 420, the update file ΔFW, ΔFW_cpr including the differences DAT_diff, by memory regions, between said compared binary files vN+1_bin, vN_bin.

Thus, if the comparison 410 is carried out bit by bit by an exclusive or operator xor, then the building of the update file ΔFW, ΔFW_cpr advantageously includes the result file "before compression" ΔFW obtained during the bit by bit comparison by the exclusive or operator xor, or non-compressed update file ΔFW.

That being said, in the non-compressed update file ΔFW, the "0" zeros, representative of identities between the versions, do not need to be sent. It is thus proposed to compress the update file ΔFW_cpr by eliminating the "0" zeros, and by introducing a header DSCR to describe the mapping of the differences DAT_diff in the binary files vN_bin, vN+1_bin. The compressor CPRSSR can include a concatenation circuit or block CONCAT provided to generate the header DSCR and group together the groups of data including differences DAT.

Figure 5:
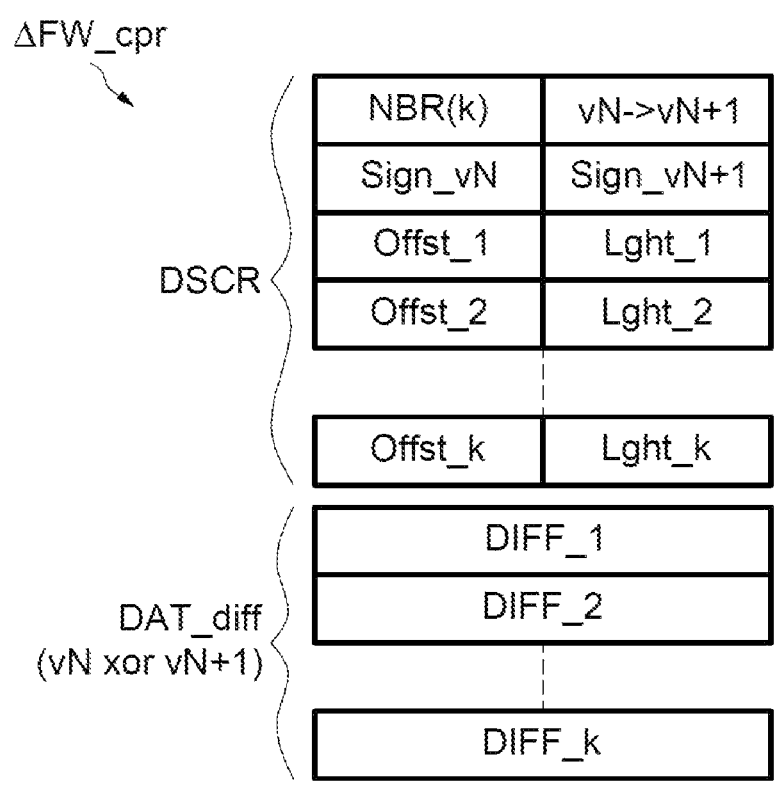
FIG. 5 illustrates an embodiment of a structure of a compressed update file.

Reference is made in this respect to FIG. 5.

FIG. 5 illustrates the structure of the compressed update file ΔFW_cpr generated by the concatenation CONCAT block described above in relation to FIG. 4.

In this example, the differences DAT_diff are communicated by memory regions, DIFF_1, DIFF_2, . . . , DIFF_k. Each memory region DIFF_i, i=[1, 2, . . . , k] corresponds to a portion of the result file of the comparison ΔFW, which can for example be identified by a respective starting address Offst_i and a respective length Lght_i. The memory regions are chosen to define the granularity with which the differences DIFF_1, DIFF_2, . . . , DIFF_k are communicated. Indeed, if a single bit changes in a given memory region, then this entire memory region of the result file of the comparison ΔFW is communicated (that is to say in this case a single "1" and the rest "0"s).

In general, the memory regions can have a size between 1 bit and an entire memory page (that is to say the maximum size accessible in the memory). In practice, the memory regions can have a size defined in octets, and for example a size of at least 16 octets.

This allows on the one hand to correspond to a reasonably minimum quantity of modifications in the binary file vN+1_bin occurring in practice in the case of modification of a reasonably minimum portion of code; on the other hand, the threshold on the size of the memory regions, for example of at least 16 octets, allows to compensate for the quantity of information to be added in the header DSCR to identify said memory regions DIFF_1, . . . , DIFF_k.

Thus, the header DSCR includes at least the identification of the memory locations, in the binary file of the earlier version vN_bin, of the memory regions having said differences DIFF_1, . . . , DIFF_k.

Advantageously, the header DSCR can include: the number "k" of memory regions containing differences NBR(k); the designation "vN→vN+1" of the earlier version vN and of the later version vN+1 to which the update applies; a signature Sign_vN, optionally truncated, of the earlier version of the software; a signature Sign_vN+1, optionally truncated, of the later version of the software; pairs containing the starting addresses Offst_1, Offst_2, . . . , Offst_k and the length Lgnth_1, Lgnth_2, . . . , Lgnth_k, for respectively each memory region DIFF_1, DIFF_2, . . . , DIFF_k. Moreover, fields can be left free in the structure of the compressed update file ΔFW_cpr, for example reserved for other future functionalities.

Figure 6:
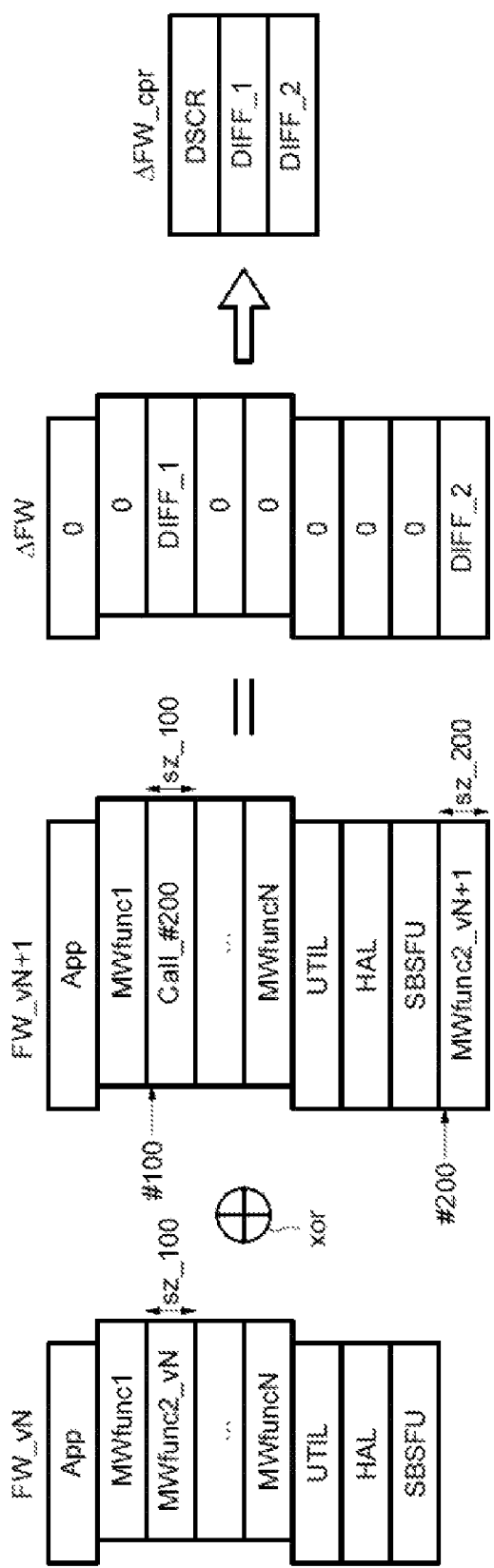
FIG. 6 illustrates an embodiment of a method of generating a compressed update file.

FIG. 6 illustrates, from an overall point of view, an embodiment of a method for generating the update file ΔFW_cpr and example advantages of various embodiments.

The earlier version of the software FW_vN and the later version of the software FW_vN+1 are shown schematically (in FIG. 6 and FIG. 7) according to the respective memory mappings of their binary files, obtained after compilation of the source code of the respective versions.

Each rectangle App, MWfunc1-MWfuncN, UTIL, HAL, SBSFU represents one or more memory locations containing a module of the software App, UTIL, HAL, SBSFU or a function of the software MWfunc1-MWfuncN.

The modules and the functions are each coded by elementary objects of the binary code, each object being contained in a section of the memory, at a respective memory location.

Given that the mapping of the memory locations of the sections of the later version FW_vN+1 have all been constrained, during the compilation 310 and mapping 320 steps, to locations identical to the locations of the corresponding sections of the earlier version FW_vN, the differences DIFF_1, DIFF_2 in the binary file of the later version FW_vN+1 correspond to effective modifications of the source code of the later version FW_vN+1.

The result of the comparison xor of the later version FW_vN+1 to the earlier version FW_vN thus reveals differences DIFF_1, DIFF_2, at the locations of the binary file FW_vN+1 corresponding to effective modifications of the source code of the later version.

Indeed, the constraint of the mapping of the binary file of the later version FW_vN+1 onto the mapping of the binary file of the earlier version FW_vN allows in particular to not engender an offset of all the memory regions MWfuncN, UTIL, HAL, SBSFU, positioned after a modified function MWfunc2_vN+1 and the size of the corresponding memory location of which has been modified.

Consequently, in the compiled binary files, the quantity of data having changed between the earlier version FW_vN and the later version FW_vN+1 is minimized, and the compression exclusively isolating the memory regions including differences DIFF_1, DIFF_2 allows to generate an extremely compact update file.

The update file ΔFW_cpr is compressed so as to not include the memory regions not having differences 0, . . . , 0 (App, MWfunc1, MWfuncN, UTIL, HAL, SBSFU) between said compared binary files vN+1_bin, vN_bin. An identification DSCR of the memory locations of the memory regions having said differences DIFF_1, DIFF_2 is communicated in the compressed update file ΔFW_cpr.

Moreover, in order to allow all the possible modifications in the source code, while preserving the advantage of the constraint of the memory sections during the mapping, it is advantageously proposed that if the binary file vN+1_bin of the later version FW_vN+1 includes a modified section MWfunc2_vN+1 having a size sz_200 larger than the size sz_100 of the first memory location #100 assigned to this section MWfunc2_vN in the earlier version FW_vN, then the link publishing LNKR assigns a larger new memory location #200, free in the earlier version FW_vN, to said modified section MWfunc2_vN+1. In parallel, the mapping LNKR automatically introduces an instruction to call or to jump Call_#200 to the new memory location #200, located in the first memory location #100.

Thus, the function MWfunc2_vN+1 can be modified without any constraint on the size sz_200 of the corresponding section(s) of the later version FW_vN+1. Moreover, the size of the section of the call or jump instruction Call_#200 is typically compatible (that is to say less than or equal to) with the size sz_100 of any section, constraining the first memory location #100.

If the binary file vN+1_bin of the later version FW_vN+1 includes a modified section MWfunc2_vN+1 having a size (not illustrated) smaller than the size sz_100 of the memory location #100 assigned to this section MWfunc2_vN in the earlier version FW_vN, then the mapping LNKR assigns the same memory location #100 having this same size sz_100, while leaving empty, or vacant, the excess size of this memory location.

"Leave empty" or "leave vacant" means that this part of the memory is not used to contain useful information, and this part of the memory can for example be filled with an arbitrary value, for example "0" zeros.

Figure 7:
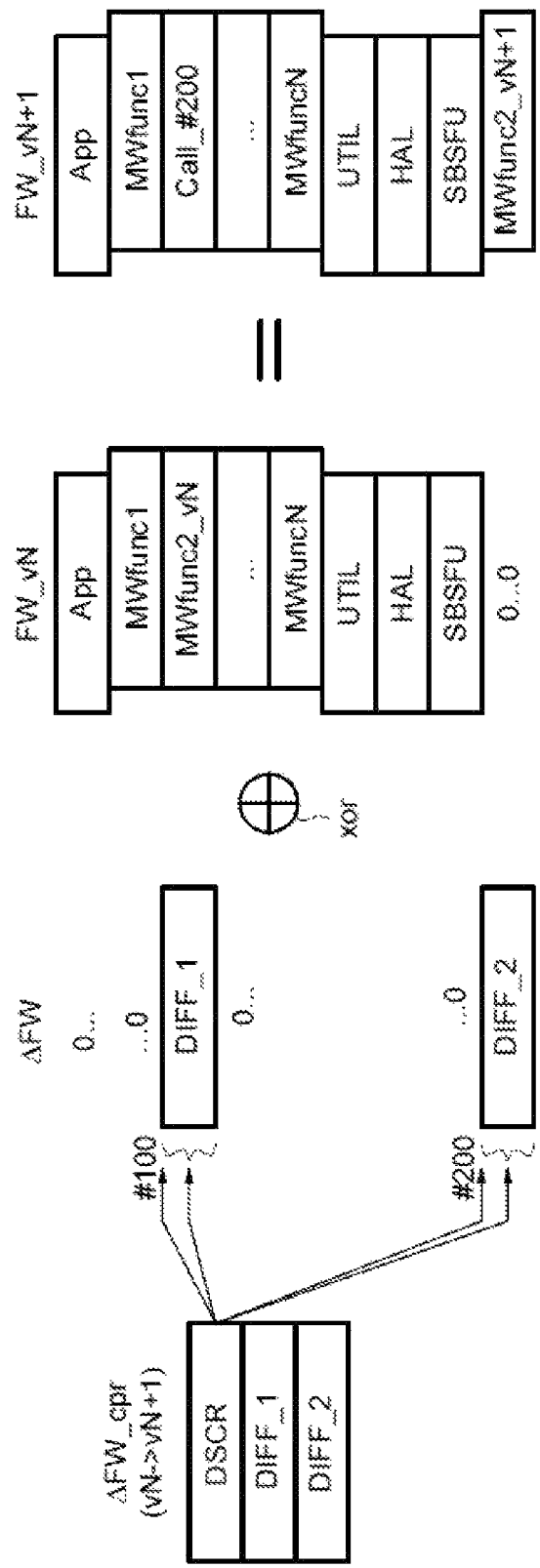
FIG. 7 illustrates an embodiment of a method of updating an earlier version of software contained in a memory of a client device, to a later version of the software, using a compressed update file generated according to an embodiment of the method of FIG. 6.

FIG. 7 illustrates the corresponding method for updating the earlier version of the software FW_vN, contained in the memory of a client device, to a later version of the software FW_vN+1, with the compressed update file ΔFW_cpr generated in the way described above in relation to FIGS. 2 to 6.

The client device includes said memory, typically a non-volatile memory such as a "Flash" or "EEPROM" (for Electrically Erasable Programmable Read Only Memory) memory, in which the binary file of the earlier version of the software FW_vN is recorded; a receiver or interface (see interface 108 of FIG. 11), configured to receive the update file ΔFW, advantageously compressed ΔFW_cpr, as described above; and processing circuitry configured to replace, in the part of the memory containing the binary file of the earlier version FW_vN, the bits of the memory regions having differences with the bits of the corresponding memory regions of the binary file of the later version FW_vN+1.

Thus, the writing of the later version of the software FW_vN+1, on the basis of the update file ΔFW, ΔFW_cpr, can be directly carried out in the memory in place of the earlier version FW_vN. In other words, it is not necessary to provide a memory space at least as large as the size of the entire software to store the update file containing the entire software, before accessing it in execution.

The processing circuitry, in operation, decompresses the compressed update file ΔFW_cpr, that is to say for example configured to read said identification DSCR and selectively access said memory locations identified.

The processing circuitry can also be configured in this respect to rebuild the file of the results of the comparison ΔFW, by filling with "0" zeros (that is to say the neutral term of the operator of the replacement of the bits in memory, the exclusive or operator in the example below) the memory regions that are not identified in the header DSCR.

In the case in which said building of the update file ΔFW, ΔFW_cpr is carried out with the results of the bit by bit comparison by the exclusive or operator xor, then the update of the software can advantageously take advantage of the property of the operator xor according to which A xor B=C⇔B=C xor A, that is to say the property according to which the operator xor is its own inverse.

Indeed given that the update file ΔFW was generated by: FW_vN xor FW_vN+1=ΔFW, then the later version FW_vN+1 is obtained, from the earlier version FW_vN and the update file ΔFW, by: FW_vN+1=FW_vN xor ΔFW.

More particularly, in the example described above in relation to FIG. 6:

DIFF_1 xor MWfunc2_vN=Call_#200 (for the first memory location #100); and DIFF_2 xor 0 . . . 0=MWfunc2_vN+1 (for the new memory location #200).

Figure 8:
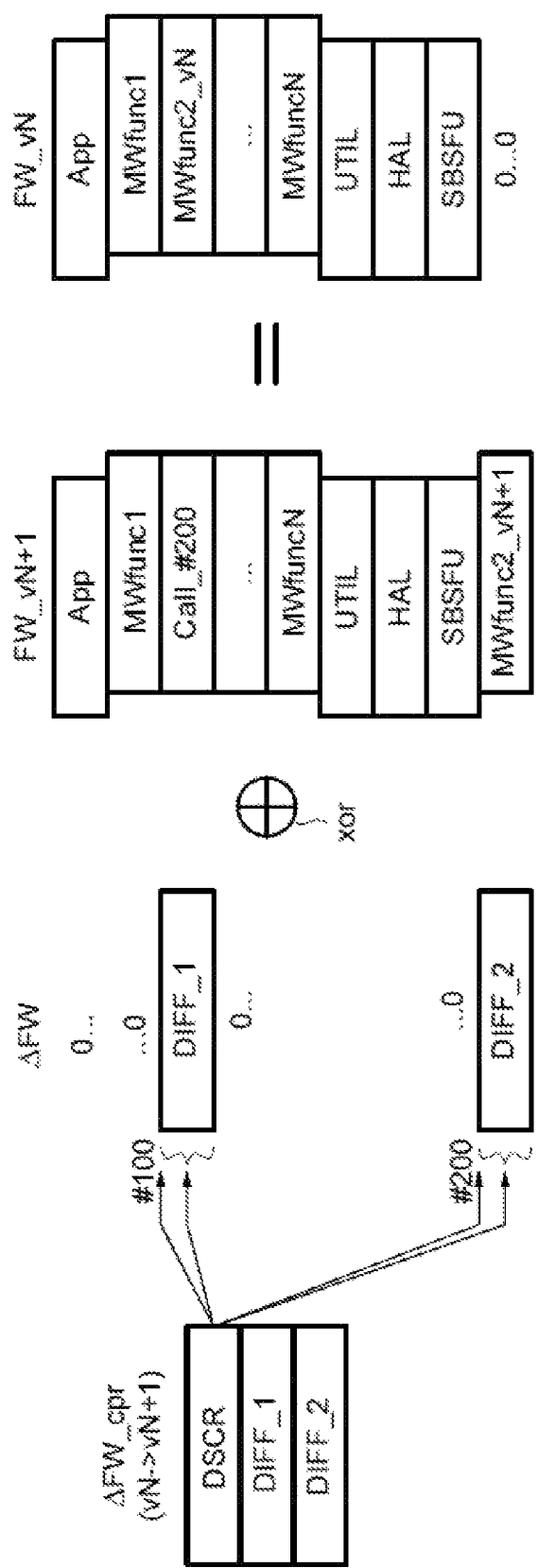
FIG. 8 is a conceptual diagram illustrating an example advantage of the property of the exclusive or operator xor according to which it is its own inverse in the context of restoring a previous version of software.

FIG. 8 illustrates another advantage of the property of the exclusive or operator xor according to which it is its own inverse (that is to say "A xor B xor B=A"), in a case in which the later version corresponds to a return to a previous version FW_vN, in place before the last update FW_vN+1 carried out.

Thus, in this case of the method for updating an earlier version of a software to a later version of the software, the earlier version FW_vN+1 was updated from a previous version FW_vN with the earlier update file ΔFW_cpr (vN→vN+1), for example as described above in relation to FIG. 7, and the later version corresponding to a return to said previous version FW_vN.

The earlier update file ΔFW_cpr (vN→vN+1) allows, via the properties of the exclusive or operator xor, to go directly back to said previous version FW_vN, by applying the replacement mechanism described above without distinction.

In details, FW_vN+1 xor ΔFW=FW_vN; and
DIFF_1 xor Call_#200=MWfunc2_vN; and
DIFF_2 xor MWfunc2_vN+1=0 . . . 0.

Figure 9:
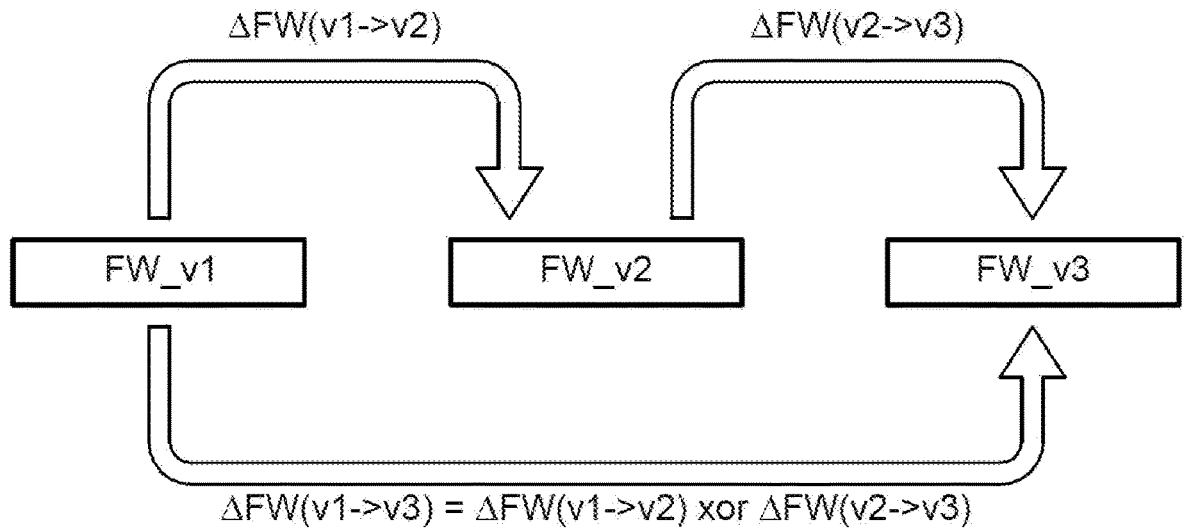
FIG. 9 is a conceptual diagram illustrating an example advantage of the property of the exclusive or operator in the context of updating a previous version which has not had intervening updates applied.

FIG. 9 illustrates another advantage of the property of the exclusive or operator, allowing, on the basis of a file for updating a version FW_v1 to a version FW_v2, and a file for updating a version FW_v2 to a version FW_v3, to immediately create the update file for the version FW_v1 to the version FW_v3.

Indeed, by construction: ΔFW(v1→v3)=ΔFW(v1→v2) xor ΔFW(v2→v3).

This allows in practice to design, by the server device, update files allowing to make up for gaps for certain client devices in a past updating campaign, in a manner benefiting both from great simplicity and from being adapted to particular cases.

Figure 10:
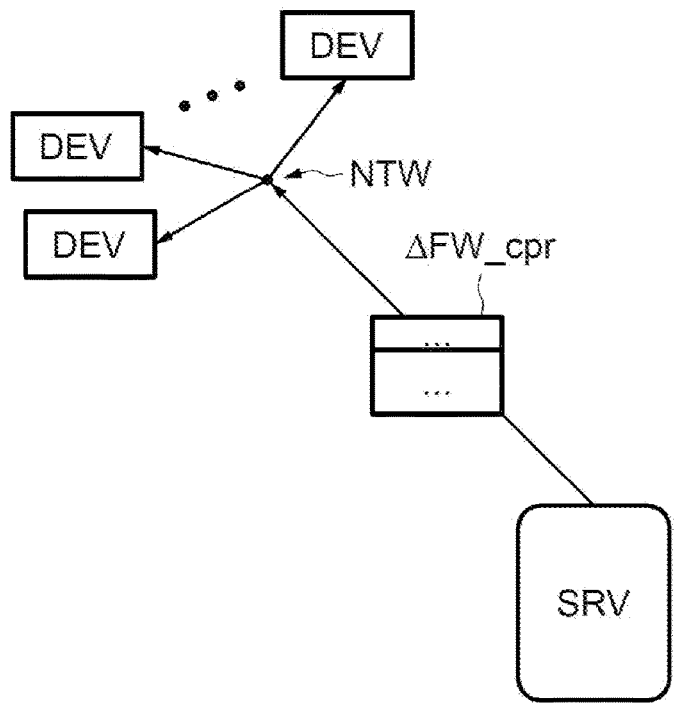
FIG. 10 is a functional block diagram of a system including a server device SRV and at least one client device DEV, capable of communicating together via a communication network NTW.

FIG. 10 schematically illustrates a system including a server device SRV and at least one client device DEV, capable of communicating together via a communication network NTW.

The server device SRV is capable of generating the file ΔFW_cpr for updating the earlier version of a software FW_vN to the later version of the software FW_vN+1, according to the method described above in relation to FIGS. 2 to 6, and is capable of communicating said update file ΔFW_cpr to the client devices via the communication network NTW.

The client devices DEV are capable of updating the earlier version of a software FW_vN contained in their memories to the later version of the software FW_vN+1 with the update file ΔFW_cpr thus communicated.

For example, the communication network NTW can advantageously be a network relatively limited in bandwidth and data rate, for example the networks of the LPWAN (for Low Power Wide Area Network) type such as LoRaWAN, BLE, Cat-M1, NB-IoT (respectively for Long Range WAN, Bluetooth Low Energy, Machine Type Communication, Category 1 and Narrow Band-IoT).

That being said, the communication network NTW can also not be particularly limited in terms of bandwidth and data rate, for example the networks of the Wi-Fi type (defined by the standard IEEE 802.11), of the LTE 4G/5G (for Long Term Evolution, 4th/5th generation) type or of the wired connection type such as Ethernet or USB.

Figure 11:
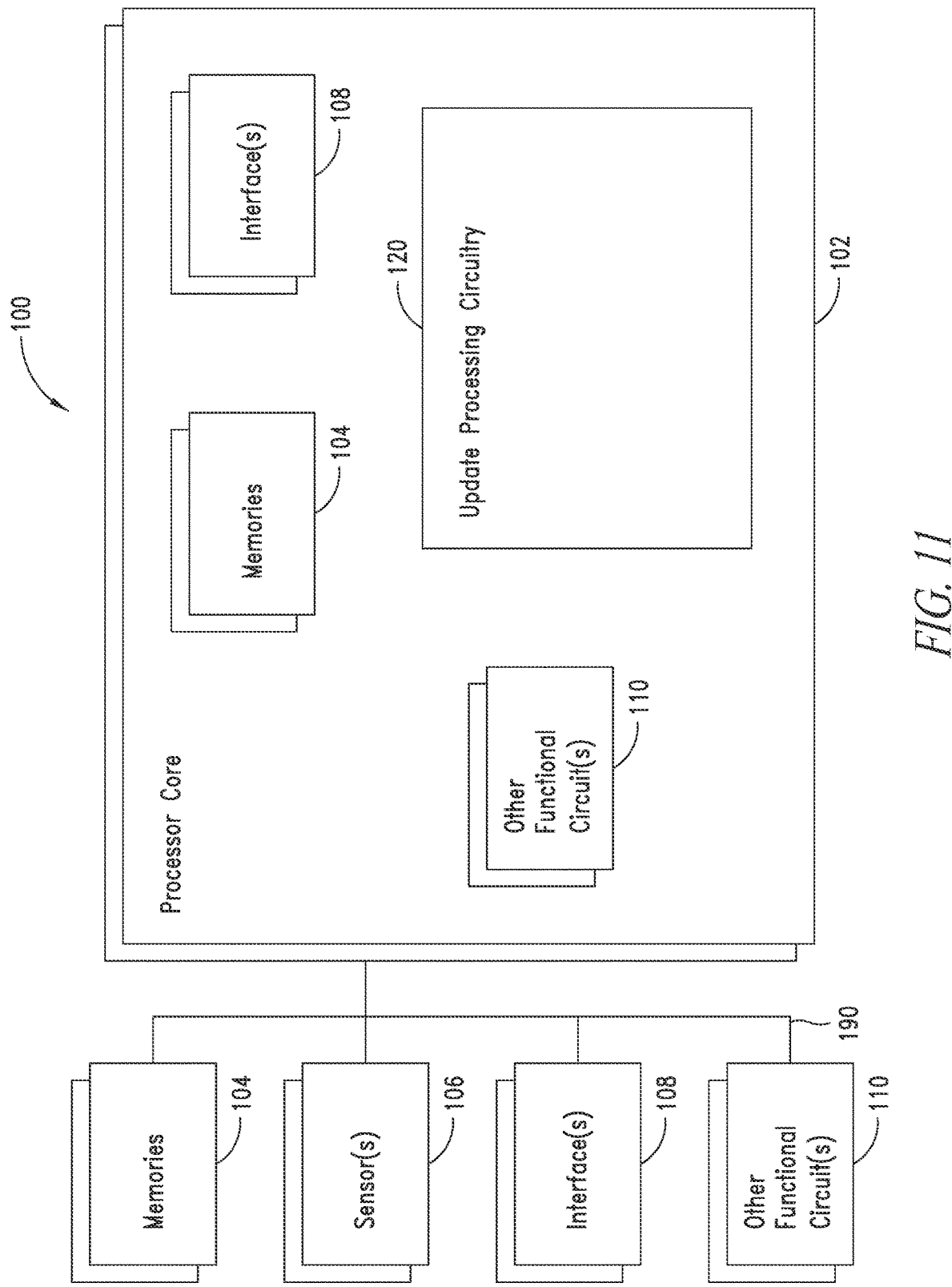
FIG. 11 is a functional block diagram of an embodiment of a computing device.

FIG. 11 is a functional block diagram of an embodiment of an electronic device or system 100 of the type to which described embodiments may apply. For example, the system 100 may be employed as one of the devices DEV in an embodiment of the system of FIG. 10. In another example, the system 100 may be employed as the server SRV in an embodiment of the system of FIG. 10.

The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify sensor data, programs which classify images using CNNs), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, general purpose registers, etc., which, in operation, may be shared by one or more processes executed by the system 100.

The system 100 may include one or more sensors 106 (e.g., image sensors, audio sensors, accelerometers, pressure sensors, temperature sensors, etc.), one or more interfaces 108 (e.g., wireless communication interfaces, wired communication interfaces, bus system interfaces, etc.), and other functional circuits 110, which may include antennas, power supplies, one or more built-in self-test (BIST) circuits, etc., and a main bus system 190. The main bus system 190 may include one or more data, address, power, interrupt, and/or control buses coupled to the various components of the system 100. Proprietary bus systems and interfaces may be employed, such as Advanced eXtensible Interface (AXI) bus systems and interfaces.

The processor 102 as illustrated includes one or more internal memories 104, one or more interfaces 108, one or more internal functional logic circuits 110. As mentioned above, the one or more internal memories 104, may include one or more volatile and/or non-volatile memories which may store, for example, all or part of instructions and data related to control of the system 100, applications and operations performed by the system 100, etc., and may include memory arrays (e.g., an internal cache memory), general purpose registers, etc., which, in operation, may be shared by one or more processes executed by the system 100. The one or more interfaces 108 may include wireless communication interfaces, wired communication interfaces, bus system interfaces, etc., and the other functional circuits 110, which may include antennas, power supplies, one or more built-in self-test (BIST) circuits, etc.

As illustrated, the system 100 includes update processing circuitry 120, which, in operation, may perform operations associated with updating embedded software in client devices such as described above with reference to FIGS. 1-10. For example, when the system 100 is employed as a server device, the update processing circuitry 120 may be configured to generate a file ΔFW_cpr for updating an earlier version of a software FW_vN to a later version of the software FW_vN+1, according to the method described above in relation to FIGS. 2 to 6, and to transmit the file ΔFW_cpr to one or more client devices (e.g., via an interface 108). When the system 100 is employed as a client device, the update processing circuitry may be configured to update the earlier version of the software FW_vN contained in the memory 104 to the later version of the software FW_vN+1 using an update file ΔFW_cpr received from a server device (e.g., via an interface 108).

Embodiments of the system 100 of FIG. 11 may include more components than illustrated, may include fewer components than illustrated, may combine components, may separate components into sub-components, and various combination thereof. For example, cryptographic circuitry may be included various components of the system 100 (e.g., the bus system 190, the sensors 106, etc., or as an additional component of the system 100).

In an embodiment, a method for generating a file for updating an earlier version of a software (FW_vN) to a later version of the software (FW_vN+1), may be summarized as including a compilation (CMPLR) of a source code (vN+1_code) generating a binary file (vN+1_bin) of the later version (FW_vN+1); a publishing of links (LNKR) assigning memory locations of a memory to sections of the binary file (vN+1_bin) of the later version (FW_vN+1), the memory locations of said sections of the later version (FW_vN+1) being constrained to be identical (vN_ScttrF) to the memory locations of the corresponding sections of the earlier version (FW_vN); a comparison between the binary file (vN+1_bin) of the later version (FW_vN+1) and a binary file (vN_bin) of the earlier version (FW_vN); and a building of the update file (ΔFW, ΔFW_cpr) including the differences (DAT_diff), by memory regions (Offst_1-Lgth_1, . . . , Offst_k-Lgth_k), between said compared binary files (vN+1_bin, vN_bin).

In an embodiment, the update file (ΔFW_cpr) may not include the memory regions not having differences (0, . . . , 0) between said compared binary files (vN+1_bin, vN_bin), and the update file (ΔFW_cpr) may include an identification (DSCR) of the memory locations, in the binary file (vN_bin, vN+1_bin) of the earlier version (FW_vN), of the memory regions having said differences (DIFF_1, . . . , DIFF_k) between said compared binary files (vN+1_bin, vN_bin).

In an embodiment, the comparison between said binary files (vN+1_bin, vN_bin) may be carried out bit by bit by an exclusive or operator (xor); and said building of the update file (ΔFW, ΔFW_cpr) may include the results of the bit by bit comparison by the exclusive or operator (xor), to communicate said differences (DIFF_1, . . . , DIFF_k) between said compared binary files (vN+1_bin, vN_bin).

In an embodiment, when the binary file (vN+1_bin) of the later version (FW_vN+1) includes a section (MWfunc2_vN+1) having a larger size in memory (sz_200) than the memory location (#100; sz_100) assigned to this section (MWfunc2_vN) in the earlier version (FW_vN), then the publishing of links (LNKR) may assign a new memory location (#200; sz_200), free in the earlier version (FW_vN), to said larger section (MWfunc2_vN+1), and may introduce an instruction for calling (Call_#200) the new memory location (#200), in the memory location (#100; sz_100) assigned to this section (MWfunc2_vN) in the earlier version.

In an embodiment, when the binary file (vN+1_bin) of the later version (FW_vN+1) includes a section (MWfunc2_vN+1) smaller in memory than the memory location (#100; sz_100) assigned to this section (MWfunc2_vN) in the earlier version, then the publishing of links (LNKR) may assign the same memory location having this same size (#100; sz_100) and may leave empty the excess size of the memory location (#100; sz_100).

In an embodiment, a method for updating an earlier version of a software (FW_vN) contained in a memory to a later version of the software (FW_vN+1), may be summarized as including receiving an update file (ΔFW, ΔFW_cpr) including the differences (DAT_diff), by memory regions (Offst_1-Lgth_1, . . . , Offst_k-Lgth_k), between a binary file (vN+1_bin) of the later version (FW_vN+1) and a binary file (vN_bin) of the earlier version (FW_vN); and replacing, in the part of the memory containing the binary file (vN_bin) of the earlier version (FW_vN), the bits of the memory regions having differences with the bits of the memory regions of the binary file (vN+1_bin) of the later version (FW_vN+1).

In an embodiment, the update file (ΔFW_cpr) may not include the memory regions not having differences (0, . . . , 0) between said compared binary files (vN+1_bin, vN_bin), and may include an identification (DSCR) of the memory locations, in the binary file (vN_bin, vN+1_bin) of the earlier version (FW_vN), of the memory regions having said differences (DIFF_1, . . . , DIFF_k) between said compared binary files (vN+1_bin, vN_bin); and said replacement may include a reading of said identification (DSCR) and selective access to said memory locations identified.

In an embodiment, the update file (ΔFW, ΔFW_cpr) may include the result of a bit by bit comparison by an exclusive or operator (xor) between the binary file of the later version (vN+1_bin) and the binary file of the earlier version (vN_bin), to communicate said differences (DIFF_1, . . . , DIFF_k) between said compared binary file (vN+1_bin, vN_bin); and said replacement may include a transformation of the bits contained in said memory regions of the binary file of the earlier version (vN_bin) by the exclusive or operator (xor) with the bits of said result of the bit by bit comparison by the exclusive or operator (xor) between said binary files (vN+1_bin, vN_bin).

In an embodiment, the updating an earlier version of a software (FW_vN+1) to a later version of the software (FW_vN), the earlier version (FW_vN+1) having been updated from a previous version (FW_vN) with the earlier update file (ΔFW, ΔFW_cpr), and the later version (FW_vN) corresponding to a return to said previous version (FW_vN), the update file (ΔFW, ΔFW_cpr) may be the earlier update file; and said replacement may include a transformation of the bits contained in said memory regions of the binary file of the earlier version by the exclusive or operator (xor) with the bits of said regions from the result of the comparison of the earlier update file.

In an embodiment, a method for updating an earlier version of a software (FW_vN) to a later version of the software (FW_vN+1), for at least one device, may be summarized as including a method for generating a file (ΔFW, ΔFW_cpr) for updating the earlier version of a software (FW_vN) to the later version of the software (FW_vN+1), by a server device (SRV); communication to said at least one device of the update file (ΔFW, ΔFW_cpr), by a communication network (NTW); and a method for updating an earlier version of a software (FW_vN) to the later version of the software (FW_vN+1), by said at least one client device (DEV).

In an embodiment, a server device, capable of generating a file for updating an earlier version of a software (FW_vN) to a later version of the software (FW_vN+1), may be summarized as including a compiler (CMPLR) configured to compile a source code (vN+1_code) so as to generate a binary file (vN+1_bin) of the later version (FW_vN+1); a link publisher (LNKR) configured to assign memory locations of a memory to sections of the binary file (vN+1_bin) of the later version (FW_vN+1), so that the memory locations of said sections of the later version (FW_vN+1) are constrained to be identical (vN_ScttrF) to the memory locations of the corresponding sections of the earlier version (FW_vN); a compressor (CPRSSR) configured to: compare the binary file (vN+1_bin) of the later version (FW_vN+1) to a binary file (vN_bin) of the earlier version (FW_vN); and to build the update file (ΔFW, ΔFW_cpr) including the differences (DAT_diff), by memory regions, between said compared binary files (vN+1_bin, vN_bin).

In an embodiment, the compressor may be configured to build the update file (ΔFW_cpr) not including the memory regions not having differences (0, . . . , 0) between said compared binary files (vN+1_bin, vN_bin), and to build the update file (ΔFW_cpr) including an identification (DSCR) of the memory locations, in the binary file (vN_bin, vN+1_bin) of the earlier version (FW_vN), of the memory regions having said differences (DIFF_1, . . . , DIFF_k) between said compared binary files (vN+1_bin, vN_bin).

In an embodiment, The compressor may be configured to: compare said binary files (vN+1_bin, vN_bin) bit by bit by an exclusive or operator (xor); and may build the update file (ΔFW, ΔFW_cpr) including the results of the bit by bit comparison by the exclusive or operator (xor), to communicate said differences (DIFF_1, . . . , DIFF_k) between said compared binary files (vN+1_bin, vN_bin).

In an embodiment, the link publisher (LNKR) may be configured, if the binary file (vN+1_bin) of the later version (FW_vN+1) includes a section (MWfunc2_vN+1) having a larger size in memory (sz_200) than the memory location (#100; sz_100) assigned to this section (MWfunc2_vN) in the earlier version (FW_vN), to assign a new memory location (#200; sz_200), free in the earlier version (FW_vN), to said larger section (MWfunc2_vN+1), and to introduce an instruction for calling (Call_#200) the new memory location (#200), in the memory location (#100; sz_100) assigned to this section (MWfunc2_vN) in the earlier version.

In an embodiment, the link publisher (LNKR) may be configured, if the binary file (vN+1_bin) of the later version (FW_vN+1) includes a section (MWfunc2_vN+1) smaller in memory than the memory location (#100; sz_100) assigned to this section (MWfunc2_vN) in the earlier version, to assign the same memory location having this same size (#100; sz_100) and to leave empty the excess size of the memory location (#100; sz_100).

In an embodiment, a client device capable of updating an earlier version of a software (FW_vN) contained in a memory to a later version of the software (FW_vN+1), may be summarized as including a receiver configured to receive an update file (ΔFW, ΔFW_cpr) including the differences (DAT_diff), by memory regions (Offst_1-Lgth_1, . . . , Offst_k-Lgth_k), between a binary file (vN+1_bin) of the later version (FW_vN+1) and a binary file (vN_bin) of the earlier version (FW_vN); and processing circuitry configured to replace, in the part of the memory containing the binary file (vN_bin) of the earlier version (FW_vN), bits of the memory regions having differences with the bits of the memory regions of the binary file (vN+1_bin) of the later version (FW_vN+1).

In an embodiment, the receiver may be configured to receive the update file (ΔFW_cpr) not including the memory regions not having differences (0, . . . , 0) between said compared binary files (vN+1_bin, vN_bin), and including an identification (DSCR) of the memory locations, in the binary file (vN_bin, vN+1_bin) of the earlier version (FW_vN), of the memory regions having said differences (DIFF_1, . . . , DIFF_k) between said compared binary files (vN+1_bin, vN_bin); and the processing circuitry may be configured to read said identification (DSCR) and selectively access said memory locations identified.

In an embodiment, the receiver may be configured to receive the update file (ΔFW, ΔFW_cpr) including the result of a bit by bit comparison by an exclusive or operator (xor) between the binary file of the later version (vN+1_bin) and the binary file of the earlier version (vN_bin), to communicate said differences (DIFF_1, . . . , DIFF_k) between said compared binary files (vN+1_bin, vN_bin); and the processing circuitry may be configured to transform the bits contained in said memory regions of the binary file of the earlier version (vN_bin) by the exclusive or operator (xor) with the bits of said result of the bit by bit comparison by the exclusive or operator (xor) between said binary files (vN+1_bin, vN_bin).

In an embodiment, the receiver may be configured to recover the earlier update file as the update file (ΔFW, ΔFW_cpr); and the processing circuitry may be configured to transform the bits contained in said memory regions of the binary file of the earlier version (vN_bin) by the exclusive or operator (xor) with the bits of said result of the earlier update file.

In an embodiment, a system includes a server device (SRV), and at least one client device (DEV), the server device being capable of communicating said file (ΔFW_cpr) for updating the earlier version of a software (FW_vN) to the later version of the software (FW_vN+1), to said at least one client device (DEV) by a communication network (NTW), and the client device (DEV) being capable of updating the earlier version of a software (FW_vN) to the later version of the software (FW_vN+1) with this update file (ΔFW_cpr).

In an embodiment, a method comprises: building an update file associated with a first version of software, the building the update file including: compiling source code associated with a second version of the software, the compiling generating a binary file of the second version of the software; mapping memory locations to sections of the binary file of the second version of the software based on mappings of sections of a binary file of the first version of the software to memory locations, wherein a section of the binary file of the second version of the software having a corresponding section in the binary file of the first version of the software is mapped to a same memory location as the corresponding section of the binary file of the first version of the software; for one or more sections of a plurality of sections of the binary file of the first version of the software, logically combining, bit-by-bit, bits of the binary file of the first version of the software with bits of the corresponding section of the binary file of the second version of the software, the logically combining including: applying an exclusive or operation; or applying an exclusive nor operation; and building the update file based on the mapping of the memory locations to sections of the binary file of the second version of the software and on results of the logical combining of the one or more sections of the plurality of sections of the binary file of the first version of the software with the corresponding sections of the binary file of the second version of the software.

In an embodiment, the building the update file includes identifying sections of the binary file of the first version of the software which are different from the corresponding sections of the binary file of the second version of the software based on the logical combining. In an embodiment, the update file includes information identifying the sections of the binary file of the first version of the software which are different from the corresponding sections of the binary file of the second version of the software. In an embodiment, the method comprises: updating the binary file of the first version of the software based on the update file, the updating the binary file of the first version of the software including logically combining bits of an identified section of the binary file of the first version of the software with bits of a result of the logical combining of the identified section of the binary file of the first version of the software with the corresponding section of the binary file of the second version of the software. In an embodiment, the method comprises: updating the binary file of the first version of the software based on the update file, the updating the binary file of the first version of the software including logically combining bits of a section of the binary file of the first version of the software with bits of a result of the logical combining of the section of the binary file of the first version of the software with the corresponding section of the binary file of the second version of the software. In an embodiment, the building the update file includes: determining whether a section of the binary file of the second version of the software mapped to a first memory location is larger than the corresponding section of the binary file of the first version of the software; and in response to determining the section of the binary file of second version of the software mapped to the first memory location is larger than the corresponding section of the binary file of the first version of the software: mapping a second memory location to the section of the binary file of the second version of the software; and including in the update file an indication to insert at the first memory location a jump or call instruction invoking the second memory location. In an embodiment, the building the update file includes: determining whether a section of the binary file of the second version of the software mapped to a first memory location is smaller than the corresponding section of the binary file of the first version of the software; and in response to determining the section of the binary file of the second version of the software mapped to the first memory location is smaller than the corresponding section of the binary file of the first version of the software, including in the update file an indication to leave a portion of the first memory location empty. In an embodiment, the logically combining comprises applying an exclusive or operation.

In an embodiment, a method comprises: updating a binary file of a first version of software to a binary file of a second version of the software based on an update file, the updating including: identifying, based on the update file, one or more sections of a plurality of sections of the binary file of the first version of the software; logically combining, bit-by-bit, bits of the identified sections of the binary file of the first version of the software with bits of the update file corresponding to the identified sections, the logically combining including: applying an exclusive or operation; or applying an exclusive nor operation; and replacing bits of the identified sections of the binary file of the first version of the software with results of the logical combining.

In an embodiment, the method comprises: receiving the update file. In an embodiment, the method comprises: compiling source code associated with the second version of the software, generating the binary file of the second version of the software; and building the update file, the building the update file including: mapping memory locations to sections of the binary file of the second version of the software based on mappings of sections of the binary file of the first version of the software to memory locations, wherein a section of the binary file of the second version of the software having a corresponding section in the binary file of the first version of the software is mapped to a same memory location as the corresponding section of the binary file of the first version of the software; for one or more sections of a plurality of sections of the binary file of the first version of the software, logically combining, bit-by-bit, bits of the binary file of the first version of the software with bits of the corresponding section of the binary file of the second version of the software, the logically combining including: applying an exclusive or operation; or applying an exclusive nor operation; and building the update file based on the mapping of the memory locations to sections of the binary file of the second version of the software and based on results of the logical combining of the one or more sections of the plurality of sections of the binary file of the first version of the software with the corresponding sections of the binary file of the second version of the software. In an embodiment, the building the update file includes identifying sections of the binary file of the first version of the software which are different from the corresponding sections of the binary file of the second version of the software based on the logical combining. In an embodiment, the updating the binary file of the first version of software includes: inserting, at a first memory location mapped to a section of the binary file of the second version of the software, which is larger that the corresponding section of the binary file of the first version of the software, a jump or call instruction identifying a second memory location; and inserting the section of the binary file of the second version of the software at the second memory location.

In an embodiment, a system comprises: an interface; and processing circuitry coupled to the interface, wherein the processing circuitry, in operation, builds an update file associated with a binary file of a first version of software, the building the update file including: compiling source code associated with a second version of the software, the compiling generating a binary file of the second version of the software; mapping memory locations to sections of the binary file of the second version of the software based on mappings of sections of the binary file of the first version of the software to memory locations, wherein a section of the binary file of the second version of the software having a corresponding section in the binary file of the first version of the software is mapped to a same memory location as the corresponding section of the binary file of the first version of the software; for one or more sections of a plurality of sections of the binary file of the first version of the software, logically combining, bit-by-bit, bits of the binary file of the first version of the software with bits of the corresponding section of the binary file of the second version of the software, the logically combining including: applying an exclusive or operation; or applying an exclusive nor operation; and building the update file based on the mapping of the memory locations to sections of the binary file of the second version of the software and based on results of the logical combining of the one or more sections of the plurality of sections of the binary file of the first version of the software with the corresponding sections of the binary file of the second version of the software.

In an embodiment, the building the update file includes: identifying sections of the binary file of the first version of the software which are different from the corresponding sections of the binary file of the second version of the software based on the logical combining; and including in the update file information identifying the sections of the binary file of the first version of the software which are different from the corresponding sections of the binary file of the second version of the software. In an embodiment, the processing circuitry, in operation, transmits the update file via the interface. In an embodiment, the building the update file includes: determining whether a section of the binary file of the second version of the software mapped to a first memory location is larger than the corresponding section of the binary file of the first version of the software; and in response to determining the section of the binary file of the second version of the software mapped to the first memory location is larger than the corresponding section of the binary file of the first version of the software: mapping a second memory location to the section of the binary file of the second version of the software; and including in the update file an indication to insert at the first memory location a jump or call instruction invoking the second memory location. In an embodiment, the system comprises: a processing device coupled to the interface, wherein the processing device, in operation updates the binary file of the first version of software based on the update file, the updating including: identifying, based on the update file, one or more sections of the plurality of sections of the binary file of the first version of the software; logically combining, bit-by-bit, bits of the identified sections of the binary file of the first version of the software with bits of the update file corresponding to the identified sections, the logically combining including: applying an exclusive or operation; or applying an exclusive nor operation; and replacing bits of the identified sections of the binary file of the first version of the software with results of the logical combining.

In an embodiment, a device comprises: a memory; and processing circuitry coupled to the memory, wherein the processing circuitry, in operation, updates a binary file of a first version of software to a binary file of a second version of the software based on an update file, the updating including: identifying, based on the update file, one or more sections of a plurality of sections of the binary file of the first version of the software; logically combining, bit-by-bit, bits of the identified sections of the binary file of the first version of the software with bits of the update file corresponding to the identified sections, the logically combining including: applying an exclusive or operation; or applying an exclusive nor operation; and replacing bits of the identified sections of the binary file of the first version of the software with results of the logical combining.

In an embodiment, the device comprises: an interface, which, in operation, receives the update file. In an embodiment, the processing circuitry, in operation: inserts, at a first memory location mapped to a section of the binary file of the second version of the software, which is larger that the corresponding section of the binary file of the first version of the software, a jump or call instruction identifying a second memory location; and inserts the section of the binary file of the second version of the software at the second memory location.

In an embodiment, a non-transitory computer-readable medium's contents cause a server to build an update file associated with a first version of software, the building the update file including: compiling source code associated with a second version of the software, the compiling generating a binary file of the second version of the software; mapping memory locations to sections of the binary file of the second version of the software based on mappings of sections of a binary file of the first version of the software to memory locations, wherein a section of the binary file of the second version of the software having a corresponding section in the binary file of the first version of the software is mapped to a same memory location as the corresponding section of the binary file of the first version of the software; for one or more sections of a plurality of sections of the binary file of the first version of the software, logically combining, bit-by-bit, bits of the binary file of the first version of the software with bits of the corresponding section of the binary file of the second version of the software, the logically combining including: applying an exclusive or operation; or applying an exclusive nor operation; and building the update file based on the mapping of the memory locations to sections of the binary file of the second version of the software and on results of the logical combining of the one or more sections of the plurality of sections of the binary file of the first version of the software with the corresponding sections of the binary file of the second version of the software. In an embodiment, the building the update file includes: identifying sections of the binary file of the first version of the software which are different from the corresponding sections of the binary file of the second version of the software based on the logical combining; and including information identifying the sections of the binary file of the first version of the software which are different from the corresponding sections of the binary file of the second version of the software in the update file. In an embodiment, the contents comprise instructions executable by the server.

In an embodiment, a non-transitory computer-readable medium's contents cause a device to update a binary file of a first version of software to a binary file of a second version of the software, the updating including: identifying one or more sections of a plurality of sections of the binary file of the first version of the software; logically combining, bit-by-bit, bits of the identified sections of the binary file of the first version of the software with bits corresponding to the identified sections, the logically combining including: applying an exclusive or operation; or applying an exclusive nor operation; and replacing bits of the identified sections of the binary file of the first version of the software with results of the logical combining. In an embodiment, the updating the binary file of the first version of software includes: inserting, at a first memory location mapped to a section of the binary file of the second version of the software, which is larger that the corresponding section of the binary file of the first version of the software, a jump or call instruction identifying a second memory location; and inserting the section of the binary file of the second version of the software at the second memory location. In an embodiment, the contents comprise the bits corresponding to the identified sections.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    building an update file associated with a first version of software, the building the update file including:
    compiling source code associated with a second version of the software, the compiling generating a binary file of the second version of the software;
    mapping memory locations to sections of the binary file of the second version of the software based on mappings of sections of a binary file of the first version of the software to memory locations, wherein a section of the binary file of the second version of the software having a corresponding section in the binary file of the first version of the software is mapped to a same memory location as the corresponding section of the binary file of the first version of the software;
    for one or more sections of a plurality of sections of the binary file of the first version of the software, logically combining, bit-by-bit, bits of the binary file of the first version of the software with bits of the corresponding section of the binary file of the second version of the software, the logically combining including:
    applying an exclusive or operation; or
    applying an exclusive nor operation; and
    building the update file based on the mapping of the memory locations to sections of the binary file of the second version of the software and on results of the logical combining of the one or more sections of the plurality of sections of the binary file of the first version of the software with the corresponding sections of the binary file of the second version of the software, wherein the building the update file further includes:
    determining whether a section of the binary file of the second version of the software mapped to a first memory location is smaller or larger than the corresponding section of the binary file of the first version of the software; and
    in response to determining the section of the binary file of second version of the software mapped to the first memory location is larger than the corresponding section of the binary file of the first version of the software:
        mapping a second memory location to the section of the binary file of the second version of the software; and
        including in the update file an indication to insert at the first memory location a jump or call instruction invoking the second memory location; or
    in response to determining the section of the binary file of the second version of the software mapped to the first memory location is smaller than the corresponding section of the binary file of the first version of the software, including in the update file an indication to leave a portion of the first memory location empty.

2. The method according to claim 1, wherein the building the update file includes identifying sections of the binary file of the first version of the software which are different from the corresponding sections of the binary file of the second version of the software based on the logical combining.

3. The method according to claim 2, wherein the update file includes information identifying the sections of the binary file of the first version of the software which are different from the corresponding sections of the binary file of the second version of the software.

4. The method of claim 3, comprising:
updating the binary file of the first version of the software based on the update file, the updating the binary file of the first version of the software including logically combining bits of an identified section of the binary file of the first version of the software with bits of a result of the logical combining of the identified section of the binary file of the first version of the software with the corresponding section of the binary file of the second version of the software.

5. The method of claim 1, comprising:
updating the binary file of the first version of the software based on the update file, the updating the binary file of the first version of the software including logically combining bits of a section of the binary file of the first version of the software with bits of a result of the logical combining of the section of the binary file of the first version of the software with the corresponding section of the binary file of the second version of the software.

6. The method of claim 1, wherein the logically combining comprises applying an exclusive or operation.

7. A method, comprising:
updating a binary file of a first version of software to a binary file of a second version of the software based on an update file, the updating including:
identifying, based on the update file, one or more sections of a plurality of sections of the binary file of the first version of the software;
logically combining, bit-by-bit, bits of the identified sections of the binary file of the first version of the software with bits of the update file corresponding to the identified sections, the logically combining including:
applying an exclusive or operation; or
applying an exclusive nor operation; and
replacing bits of the identified sections of the binary file of the first version of the software with results of the logical combining, wherein the updating the binary file of the first version of software to the binary file of the second version of the software further includes:
inserting, at a first memory location mapped to a first section of the binary file the second version of the software, which is larger than the corresponding section of the binary file of the first version of the software, a jump or call instruction identifying a second memory location, and inserting the section of the binary file of the second version of the software at the second memory location; or
responding to an indication in the update file that a second section of the binary file of the second version of the software is smaller than the corresponding section of the binary file of the first version of the software by leaving empty a portion of a memory location to which the second section of the binary file of the second version of the software is mapped.

8. The method of claim 7, comprising:
receiving the update file.

9. The method of claim 7, comprising:
compiling source code associated with the second version of the software, generating the binary file of the second version of the software; and
building the update file, the building the update file including:
mapping memory locations to sections of the binary file of the second version of the software based on mappings of sections of the binary file of the first version of the software to memory locations, wherein a section of the binary file of the second version of the software having a corresponding section in the binary file of the first version of the software is mapped to a same memory location as the corresponding section of the binary file of the first version of the software;
for one or more sections of a plurality of sections of the binary file of the first version of the software, logically combining, bit-by-bit, bits of the binary file of the first version of the software with bits of the corresponding section of the binary file of the second version of the software, the logically combining including:
applying an exclusive or operation; or
applying an exclusive nor operation; and
building the update file based on the mapping of the memory locations to sections of the binary file of the second version of the software and based on results of the logical combining of the one or more sections of the plurality of sections of the binary file of the first version of the software with the corresponding sections of the binary file of the second version of the software.

10. The method according to claim 9, wherein the building the update file includes identifying sections of the binary file of the first version of the software which are different from the corresponding sections of the binary file of the second version of the software based on the logical combining.

11. A system, comprising:
an interface; and
processing circuitry coupled to the interface, wherein the processing circuitry, in operation, builds an update file associated with a binary file of a first version of software, the building the update file including:
compiling source code associated with a second version of the software, the compiling generating a binary file of the second version of the software;
mapping memory locations to sections of the binary file of the second version of the software based on mappings of sections of the binary file of the first version of the software to memory locations, wherein a section of the binary file of the second version of the software having a corresponding section in the binary file of the first version of the software is mapped to a same memory location as the corresponding section of the binary file of the first version of the software;
for one or more sections of a plurality of sections of the binary file of the first version of the software, logically combining, bit-by-bit, bits of the binary file of the first version of the software with bits of the corresponding section of the binary file of the second version of the software, the logically combining including:
applying an exclusive or operation; or
applying an exclusive nor operation; and
building the update file based on the mapping of the memory locations to sections of the binary file of the second version of the software and based on results of the logical combining of the one or more sections of the plurality of sections of the binary file of the first version of the software with the corresponding sections of the binary file of the second version of the software, wherein the building the update file further includes:
determining whether a section of the binary file of the second version of the software mapped to a first memory location is smaller or larger than the corresponding section of the binary file of the first version of the software; and
in response to determining the section of the binary file of second version of the software mapped to the first memory location is larger than the corresponding section of the binary file of the first version of the software:
mapping a second memory location to the section of the binary file of the second version of the software; and
including in the update file an indication to insert at the first memory location a jump or call instruction invoking the second memory location; or
in response to determining the section of the binary file of the second version of the software mapped to the first memory location is smaller than the corresponding section of the binary file of the first version of the software, including in the update file an indication to leave a portion of the first memory location empty.

12. The system of claim 11, wherein, the building the update file includes:
identifying sections of the binary file of the first version of the software which are different from the corresponding sections of the binary file of the second version of the software based on the logical combining; and
including in the update file information identifying the sections of the binary file of the first version of the software which are different from the corresponding sections of the binary file of the second version of the software.

13. The system of claim 12, wherein the processing circuitry, in operation, transmits the update file via the interface.

14. The system of claim 13, comprising:
a processing device coupled to the interface, wherein the processing device, in operation updates the binary file of the first version of software based on the update file, the updating including:
identifying, based on the update file, one or more sections of the plurality of sections of the binary file of the first version of the software;
logically combining, bit-by-bit, bits of the identified sections of the binary file of the first version of the software with bits of the update file corresponding to the identified sections, the logically combining including:
applying an exclusive or operation; or
applying an exclusive nor operation; and
replacing bits of the identified sections of the binary file of the first version of the software with results of the logical combining.

15. A device, comprising:
a memory; and
processing circuitry coupled to the memory, wherein the processing circuitry, in operation, updates a binary file of a first version of software to a binary file of a second version of the software based on an update file, the updating including:
identifying, based on the update file, one or more sections of a plurality of sections of the binary file of the first version of the software;
logically combining, bit-by-bit, bits of the identified sections of the binary file of the first version of the software with bits of the update file corresponding to the identified sections, the logically combining including:
applying an exclusive or operation; or
applying an exclusive nor operation; and
replacing bits of the identified sections of the binary file of the first version of the software with results of the logical combining, wherein the updating the binary file of the first version of software to the binary file of the second version of the software further includes:
inserting, at a first memory location mapped to a first section of the binary file of the second version of the software, which is larger than the corresponding section of the binary file of the first version of the software, a jump or call instruction identifying a second memory location, and inserting the section of the binary file of the second version of the software at the second memory location; or
responding to an indication in the update file that a second section of the binary file of the second version of the software is smaller than the corresponding section of the binary file of the first version of the software by leaving empty a portion of memory location to which the second section of the binary file of the second version of the software is mapped.

16. The device of claim 15, comprising:
an interface, which, in operation, receives the update file.

17. A non-transitory computer-readable medium having contents which cause a server to build an update file associated with a first version of software, the building the update file including:
compiling source code associated with a second version of the software, the compiling generating a binary file of the second version of the software;
mapping memory locations to sections of the binary file of the second version of the software based on mappings of sections of a binary file of the first version of the software to memory locations, wherein a section of the binary file of the second version of the software having a corresponding section in the binary file of the first version of the software is mapped to a same memory location as the corresponding section of the binary file of the first version of the software;
for one or more sections of a plurality of sections of the binary file of the first version of the software, logically combining, bit-by-bit, bits of the binary file of the first version of the software with bits of the corresponding section of the binary file of the second version of the software, the logically combining including:
applying an exclusive or operation; or
applying an exclusive nor operation; and
building the update file based on the mapping of the memory locations to sections of the binary file of the second version of the software and on results of the logical combining of the one or more sections of the plurality of sections of the binary file of the first version of the software with the corresponding sections of the binary file of the second version of the software, wherein the building the update file further includes:
determining whether a section of the binary file of the second version of the software mapped to a first memory location is smaller or larger corresponding section of the binary file of the first version of the software; and in response to determining section of the binary file of second version of the software mapped to the first memory location is larger than the corresponding section of the binary file of the first version of the software:

mapping a second memory location to the section of the binary file of the second version of the software; and including in the update file an indication to insert at the first memory location a jump or call instruction invoking the second memory location; or in response to determining the section of the binary file of the second version of the software mapped to the first memory location is smaller than the corresponding section of the binary file of the first version of the software, including in the update file an indication to leave a portion of the first memory location empty.

18. The non-transitory computer-readable medium of claim 17, wherein the building the update file includes:

identifying sections of the binary file of the first version of the software which are different from the corresponding sections of the binary file of the second version of the software based on the logical combining; and including information identifying the sections of the binary file of the first version of the software which are different from the corresponding sections of the binary file of the second version of the software in the update file.

19. The non-transitory computer-readable medium of claim 17, wherein the contents comprise instructions executable by the server.

20. A non-transitory computer-readable medium having contents which cause a device to update a binary file of a first version of software to a binary file of a second version of the software, the updating including:

identifying one or more sections of a plurality of sections of the binary file of the first version of the software;

logically combining, bit-by-bit, bits of the identified sections of the binary file of the first version of the software with bits corresponding to the identified sections, the logically combining including:

applying an exclusive or operation; or applying an exclusive nor operation; and replacing bits of the identified sections of the binary file of the first version of the software with results of the logical combining, wherein the updating the binary file of the first version of software to the binary file of the second version of the software further includes:

inserting, at a first memory location mapped to a first section of the binary file of the second version of the software, which is larger than the corresponding section of the binary file of the first version of the software, a jump or call instruction identifying a second memory location, and inserting the section of the binary file of the second version of the software at the second memory location; or responding to an indication that a second section of the binary file of the second version of the software is smaller than the corresponding section of the binary file of the first version of the software by leaving empty a portion of a memory location to which the second section of the binary file of the second version of the software is mapped.

21. The non-transitory computer-readable medium of claim 20, wherein the contents comprise the bits corresponding to the identified sections.

* * * * *